United States Patent [19]

Landry et al.

[11] Patent Number: 5,387,636
[45] Date of Patent: Feb. 7, 1995

[54] FLAME-RETARDED HIPS FORMULATIONS WITH ENHANCED IMPACT STRENGTH

[75] Inventors: Susan D. Landry; F. Alexander Pettigrew, both of Baton Rouge, La.

[73] Assignee: Albemarle Corporation, Richmond, Va.

[21] Appl. No.: 147,901

[22] Filed: Nov. 4, 1993

Related U.S. Application Data

[63] Continuation of Ser. No. 923,604, Aug. 3, 1992, abandoned, which is a continuation-in-part of Ser. No. 745,003, Aug. 14, 1991, abandoned.

[51] Int. Cl.$^6$ .......................... C08K 3/38; C08K 3/16; C08L 53/00
[52] U.S. Cl. .................... 524/404; 524/405; 524/411; 524/412; 524/430; 524/431; 524/468; 524/505
[58] Field of Search ............... 524/411, 412, 404, 405, 524/430, 431, 468, 505

[56] References Cited

U.S. PATENT DOCUMENTS

| | | | |
|---|---|---|---|
| 3,971,758 | 7/1976 | Anderson et al. | 260/45.9 KA |
| 4,067,930 | 1/1978 | Versnel et al. | 260/880 R |
| 4,130,605 | 12/1978 | Barkhuff, Jr. | 260/876 R |
| 4,150,066 | 4/1979 | Kudo et al. | 260/876 R |
| 4,301,058 | 11/1981 | Nuekirchen et al. | 260/49 R |
| 4,639,486 | 1/1987 | Liu | 524/409 |
| 4,751,260 | 6/1988 | Kress et al. | 524/130 |
| 5,036,126 | 7/1991 | Rinehart et al. | 524/141 |
| 5,059,650 | 10/1991 | Goettsch et al. | 524/412 |
| 5,281,648 | 1/1994 | Doucet et al. | 524/505 |

FOREIGN PATENT DOCUMENTS

| | | |
|---|---|---|
| 2239497 | 1/1975 | France . |
| 2343015 | 9/1977 | France . |
| 1095143A | 10/1987 | Japan . |
| 1572659 | 7/1980 | United Kingdom . |

Primary Examiner—Paul R. Michl
Assistant Examiner—LaVonda R. DeWitt
Attorney, Agent, or Firm—E. E. Spielman, Jr.

[57] ABSTRACT

The impact strength of articles made from a flame-retarded formulated HIPS resin containing an impact modifier is increased by forming a concentrate or masterbatch containing the flame retardant and impact modifier, blending the concentrate with HIPS resin, and extruding the resultant blend.

22 Claims, No Drawings

FLAME-RETARDED HIPS FORMULATIONS WITH ENHANCED IMPACT STRENGTH

This application is a continuation of copending application Ser. No. 07/923,604, filed Aug. 3, 1992 now abandoned, which in turn is a continuation-in-part of application Ser. No. 07/745,003, filed Aug. 14, 1991 now abandoned.

This invention is in the field of thermoplastic synthetic resin formulations, especially HIPS (high impact polystyrene) resins flame-retarded with at least one brominated organic flame retardant, as well as a method for producing the formulations.

BACKGROUND

HIPS resins are well known in the synthetic organic polymer art as a class of thermoplastics which offers excellent mechanical properties as well as good chemical resistance. The general characteristics of HIPS resins are described, for example, in "Modern Plastics Encyclopedia," McGraw-Hill, New York, N.Y., 1990, p 96. HIPS resins are "rubber-modified" copolymers or homopolymers of styrenic compounds. They are known for their ease of processing, good dimensional stability, impact strength, and rigidity. They generally are prepared by dissolving an elastomer in a styrenic monomer before polymerization of the latter, but the elastomer can also be incorporated in other ways.

For purposes of the instant invention, a HIPS resin is a thermoplastic which can be a homopolymer or random or block copolymer produced by polymerizing one or more vinyl aromatic monomers such as styrene, alkyl-substituted styrenes, halo-substituted styrenes, or alpha-alkyl styrenes or substituted styrenes, in the presence of an elastomer monomer or polymer, such as polybutadiene, for example. Further, a formulated HIPS resin, for all purposes herein, comprises at least about 50 wt % HIPS resin. The remainder of the formulated HIPS resin comprises various monomeric or polymeric additives which modify the properties of the HIPS resin. These additives include, for example, various impact modifiers, stabilizers, processing aids, pigments, flame retardants, synergists, etc. Such additional additives can be incorporated into the HIPS resin in various ways.

Incorporation of the various additives is not a trivial matter, and the properties of articles made from the formulated HIPS resin can be affected by the manner in which it is done. When the additives are solids, dry-blending can be employed. For example, the solids can be mixed and heated to soften and homogenize the mass, which can then be sheeted, chopped, and pelletized.

A flame retardant, such as a halogenated organic compound, is often incorporated into a formulated HIPS resin so as to constitute as much as about 20–25 wt % of the formulation. Such incorporation can adversely affect the properties, other than the flammability, of the formulated HIPS resin. For example, a flame retardant having a high melting point range, such as decabromodiphenylethane, or decabromodiphenyl oxide will have a filler type effect on the HIPS resin formulation, whereas a flame retardant having a lower melting point range will have a plasticizer effect on the formulation. Because of the effect flame retardants have on articles containing such HIPS resin formulations, improvements in such formulations and formulation techniques are highly desirable and of significant commercial importance.

SUMMARY OF THE INVENTION

Consequently, it is an object of this invention to provide a formulated HIPS resin in which a halogenated organic flame retardant is incorporated in such a way as to provide a significant net increase in the impact strength of articles prepared from the HIPS resin formulation. Other objects will become apparent hereinafter.

In attaining the aforesaid objectives, this invention provides a flame-retarded HIPS formulation which comprises at least about 65 wt % HIPS resin, about 5–25 wt % halogenated flame retardant, about 1–12 wt % polymeric impact modifier, and optionally, about 0–6 wt % flame retardant synergist. The flame retardant is incorporated in the flame-retarded HIPS formulation by forming a concentrate or masterbatch containing the flame retardant, impact modifier, and optionally, other additives; blending the concentrate with the HIPS resin; and extruding the resultant blend thereby forming a formulated HIPS resin which will provide enhanced IZOD impact strength as determined by ASTM D 256-88 to articles made from the HIPS resin formulation. It has been found surprisingly, and quite unexpectedly, that the IZOD impact strength of articles containing the HIPS resin formulation of this invention when prepared according to the method described herein is dramatically increased over articles prepared from a HIPS formulation in which the flame retardant, impact modifier, HIPS resin, and optional flame retardant synergist are combined without initially forming a concentrate or masterbatch of flame retardant and impact modifier.

For the purposes of this invention, the terms "concentrate", "masterbatch", and "masterbatching" refer to a homogeneous blend comprising flame retardant and impact modifier, and optionally, other additives, provided the other additives do not adversely affect the IZOD impact strength of articles prepared from the formulated HIPS resin. It is of course understood, that such a concentrate or masterbatch may also contain a minor amount of HIPS resin sufficient to provide a homogeneous blend of the masterbatch components.

DETAILED DESCRIPTION

The HIPS resin component of the formulated HIPS can be selected from the many resins available in commerce. Such resins include the Dow Styron ® resins, for example, which are styrene/butadiene copolymers. The HIPS resin component of the formulated HIPS resin of this invention comprises at least about 65 wt % of the formulation, and the HIPS resin can comprise as much as about 85 wt % of the formulation.

One of the additives which will be present in the formulated HIPS resin of this invention is one or more flame retardants, and halogenated flame retardants have been recommended and employed in that application. Halogenated flame retardants especially useful in the practice of this invention are selected from the group consisting of tetrahalobisphenol A, N,N'-bis(tetrahalophthalimide), N,N'-ethylenebis(tetrahalophthalimide), halogenated polystyrene, and pentahalobenzyl acrylate, in all of which halo is selected from chloro and bromo, and also bis-halophenyl compounds represented by the following structural formula which are solids at ambient temperature:

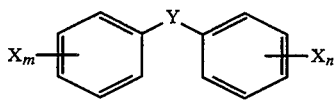

in which formula each X is selected independently from chlorine and bromine; m and n can be the same or different and can range from 1 to 5; Y is selected from oxygen, alkylene, —NR— (where R is selected from hydrogen and hydrocarbyl), alkylenedioxy, aryldioxy, and a chemical bond. Alkylene is preferably lower alkylene, i.e., straight chain or branched $C_1$-$C_6$, such as methylene, ethylene, isopropylene, butylene, t-butylene, and the like, methylene or ethylene being preferred. Hydrocarbyl includes alkylene, especially lower alkylene, but also unsaturated alkylene and aromatic groups such as phenyl and alkylphenyl or halophenyl. Alkylenedioxy includes methylenedioxy, 1,2-dioxyethylene, and the like, while aryldioxy includes dioxyphenyl, for example. In the preferred flame retardants halo and X are bromo. Among the aforesaid flame retardants the bishalophenyl compounds are preferred, and among these compounds, decabromodiphenyl oxide, decabromodiphenyl ethane, 1,2-bis(tri-bromophenoxy)ethane, and decabromodiphenyl amine are especially attractive.

In addition to the halogenated flame retardant, the formulated HIPS resin of this invention optionally includes one or more flame retardant synergist in an amount ranging from about 2 to about 6 wt %. A number of materials, such as metal oxides, e.g., iron oxide, tin oxide, zinc oxide, aluminum trioxide, alumina, antimony tri- and pentoxide, and boron compounds, e.g., zinc borate; also antimony silicates and ferrocene, are known to enhance the effectiveness of flame retardants, especially halogenated flame retardants. A particularly effective and preferred synergist is antimony trioxide. The flame retardant synergist can be combined with the flame retardant and impact modifier in the concentrate or masterbatch, or the synergist can be admixed with the HIPS resin component of the formulation.

In addition to flame retardant, the formulated HIPS resin of this invention includes one or more polymeric impact modifiers. It is well known that the addition of certain materials to a HIPS resin tends to toughen articles molded therefrom. Among these materials are styrene/butadiene/styrene triblock copolymer, styrene/isoprene/styrene triblock copolymer, styrene/butadiene diblock copolymer, polycaprolactone, and functionalized ethylene/propylene copolymers. Among these impact modifiers, a styrene/butadiene/styrene triblock copolymer is especially effective.

The concentrate or masterbatch of this invention can be formed by conventional techniques such as by combining, either continuously or batchwise, the flame retardant, impact modifier, and optional additives in a stirred kettle, drum mixer, mixing tube, mechanical high-intensity mixer, kneader, or extruder whereby a homogeneous blend of the concentrate or masterbatch is obtained. It will of course be recognized that only those innocuous ingredients which do not adversely affect the IZOD impact strength of articles made from the fully formulated HIPS resin will be included in the concentrate or masterbatch. Such a determination can be made empirically by simple trial and error techniques. Accordingly, the optional additives may be selected from pigments, flame retardant synergists, thermal stabilizers, plasticizers, antistatic agents, ultraviolet stabilizers, blowing agents, fillers, reinforcing rubbers, and the like.

The temperature for forming the concentrate or masterbatch of this invention is not critical, provided the temperature is low enough to avoid thermal degradation of the concentrate, yet high enough to provide a homogeneous blend of the concentrate's components. Those skilled in the art can readily determine suitable processing temperatures.

After forming the concentrate or masterbatch, the concentrate is combined with the HIPS resin to form the flame retardant HIPS formulation. Such a combination can be obtained by the use of a single or twin screw extruder, a high intensity mixer, or a continuous mixer. It is understood of course, that when an extruder is used, the concentrate and the HIPS resin may be combined and fed to the extruder, or the concentrate and HIPS resin may be fed to the extruder separately.

A typical flame-retarded formulated HIPS resin of this invention, which contains brominated flame retardant, and a polymeric impact modifier, in addition to the HIPS resin, is described in the Example.

EXAMPLE

A. The components indicated in column A, Table 1 were dry-blended by shaking them together for about 2 min in a plastic bag. The mixture was then extruded on a Haake-Buchler System 40 Rheometer equipped with a twin-screw extruder head. The extrusion was carried out at 175°-190°-215°-215° C. and 65 rpm. The extruded material was cooled in an ice bath, and then pelletized. The pellets were then injection molded into ⅛" test bars on a Battenfeld BSKM 100/40 machine at 216° C. and tested for IZOD impact strength according to ASTM D 256-88. This Example A is not within the scope of this invention.

B. The components indicated in column B, Table 1 were combined as follows: The flame retardant, impact modifier, and processing aid were blended in a Brabender mixer at 175° C. and 66 rpm for 2 min. The resultant blend was sheeted on a two-roll mill and chopped into small pieces in an Osterizer mixer, affording a masterbatch. An amount of the masterbatch appropriate to the desired composition was dry-blended with the remaining ingredients, i.e., HIPS and antimony trioxide, in a bag for about 2 min. The combination was then extruded, cooled, pelletized, and molded as described in A above, and the IZOD impact strength (ASTM D 256-88) of the molded material was measured.

TABLE 1

| Component | A (wt %) | B (wt %) |
|---|---|---|
| HIPS Resin; (Dow Styron ® 492T) | 80.5 | 80.5 |
| Impact Modifier; Sty/But/Sty Block (Kraton ® D4141 of Shell Chemical Co.) | 3.0 | 3.0[a] |
| Flame Retardant; Decabromodiphenylethane (Ethyl Corp.) | 12.0 | 12.0[a] |
| Synergist; $Sb_2O_3$ | 4.0 | 4.0 |
| Processing Aid; Zinc Stearate | 0.5 | 0.5[a] |
| IZOD Impact Strength (ft-lb/in notch) | 1.4 ± 0.1 | 2.04 ± 0.03 |

TABLE 1-continued

| Component | A (wt %) | B (wt %) |
|---|---|---|
| (ASTM D 256-88) | | |

[a] component of masterbatch

Example B was repeated with the temperatures of the twin screw extruder at 160°-190°-215°-215°° C. The IZOD impact strength (ASTM D 256-88) of the resultant test bars was 2.02±0.05 ft-lb/in notch. The data from the Example show that masterbatching increased the impact strength of HIPS by about 46%.

It will be evident to those skilled in the art that considerable variation in the specific nature and relative amounts of the components of the formulated HIPS resin of this invention, as well as in the manner in which those components are combined is possible within the contemplation of this invention and that the invention is limited only by reference to the following claims.

What is claimed is:

1. A flame-retarded HIPS resin formulation which provides improved impact resistance to test bars made from such HIPS resin formulation comprising
   a) a concentrate containing a blend of (i) about 5-25 wt. % of one or more halogenated organic flame retardants, (ii) about 1-12 wt. % of one or more polymeric impact modifiers, and (iii) a synergistically effective amount of one or more flame retardant synergist; and
   b) at least about 50 wt. % HIPS resin; whereby test bars made from the HIPS resin formulation have an enhanced IZOD impact strength as determined by ASTM-D 256-88 which is greater than the IZOD impact strength of test bars made from a HIPS resin formulation containing (a) (i), (a) (ii), (a) (iii), and (b) without initially forming the concentrate of (a) (i), (a) (ii), and (a) (iii), the weight percent of each constituent being based upon the total weight of the blended combination of (a) and (b) and the one or more polymeric impact modifiers being selected from the group consisting of styrene/butadiene/styrene triblock copolymers, styrene/isoprene/styrene triblock copolymers, styrene/butadiene diblock copolymers, polycaprolactone, and functionalized ethylene/propylene copolymers.

2. The formulation of claim 1 wherein said polymeric impact modifier comprises a styrene/butadiene/styrene triblock copolymer.

3. The formulation of claim 1 wherein the concentrate contains up to about 6 wt. % flame retardant synergist based on the total weight of the HIPS resin formulation.

4. The formulation of claim 3 wherein said one or more flame retardant synergists is selected from the group consisting of metal oxides, hydroxides, and silicates, boron compounds and ferrocene.

5. The formulation of claim 4 wherein said flame retardant synergist is antimony trioxide.

6. The formation of claim 1 wherein said one or more halogenated organic flame retardants is selected from the group consisting of: tetrahalobisphenol A; N,N'-bis(tetrahalophthalimide); N,N'-ethylenebis(tetrahalophthalimide); halogenated polystyrene; pentahalobenzyl acrylate; and bis-halophenyl compounds of the structural formula

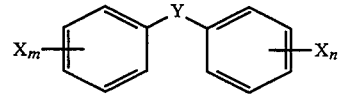

in which each X is selected independently from chlorine and bromine; m and n can be the same or different and can range from 1 to 5; and Y is selected from oxygen, alkylene, —NR— (where R is selected from hydrogen and hydrocarbyl), alkylenedioxy, aryldioxy, and a chemical bond.

7. The formulation of claim 6 wherein each X is bromine.

8. The formulation of claim 7 wherein m and n are 4 or 5.

9. The formulation of claim 6 wherein said one or more flame retardants is selected from the group consisting of decabromodiphenyl oxide, decabromodiphenylethane, 1,2-bis(tribromophenoxy)ethane, decabromodiphenyl amine, and pentabromobenzyl acrylate.

10. The formulation of claim 9 wherein said flame retardant is decabromodiphenylethane.

11. The formulation of claim 6 wherein said flame retardant is N,N'-ethylenebis(tetrabromophthalimide).

12. A method for enhancing the impact resistance of test bars made from a flame retarded formulation HIPS resin which includes at least about 50 wt. % HIPS resin, about 5-25 wt. % of one or more halogenated organic flame retardants, about 1-12 wt. % of one or more polymeric impact modifiers, and a synergistically effective amount of one or more flame retardant synergists, which method comprises forming a concentrate containing said one or more flame retardants, one or more polymeric impact modifiers, and one or more flame retardant synergists, blending said concentrate with said HIPS resin; and extruding the resultant blend thereby forming said formulating HIPS resin, wherein the weight percent of each constituent is based upon the total weight of the formulated HIPS resin, and wherein the one or more polymeric impact modifiers is selected from the group consisting of styrene/butadiene/styrene triblock copolymers, styrene/isoprene/styrene triblock copolymers, styrene/butadiene diblock copolymers, polycaprolactone and functionalized ethylene/propylene copolymers.

13. The method of claim 12 wherein said one or more polymeric impact modifiers comprises a styrene/butadiene/styrene triblock copolymer.

14. The method of claim 12 wherein said one or more flame retardant synergists is selected from the group consisting of metal oxides, hydroxides, and silicates, boron compounds, and ferrocene.

15. The method of claim 14 wherein said flame retardant synergist is antimony trioxide.

16. The method of claim 12 wherein said one or more halogenated organic flame retardants is selected from the group consisting of: tetrahalobisphenol A; N,N'-bis(tetrahalophthalimide); N,N'-ethylenebis(tetrahalophthalimide); halogenated polystyrene; pentahalobenzyl acrylate; and bis-halophenyl compounds of the structural formula

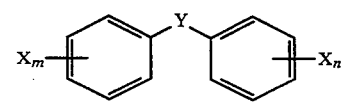

in which each X is selected independently from chlorine and bromine; m and n can be the same or different and can range from 1 to 5; and Y is selected from oxygen, alkylene, —NR— (where R is selected from hydrogen and hydrocarbyl), alkylenedioxy, aryldioxy, and a chemical bond.

17. The method of claim 16 wherein each X is bromine.

18. The method of claim 17 wherein m and n are 4 or 5.

19. The method of claim 16 wherein said one or more flame retardants is selected from the group consisting of decabromodiphenyl oxide, decabromodiphenyl-ethane, 1,2-bis(tribromophenoxy)ethane, decabromodiphenyl amine, and pentabromobenzyl acrylate.

20. The method of claim 19 wherein said flame retardant is decabromodiphenylethane.

21. The method of claim 16 wherein said flame retardant is N,N'-ethylenebis(tetrahalophthalimide).

22. The method of claim 15 wherein the concentrate contains up to about 6 weight percent flame retardant synergist based on the total weight of the HIPS resin formulation.

* * * * *

UNITED STATES PATENT AND TRADEMARK OFFICE
CERTIFICATE OF CORRECTION

PATENT NO. : 5,387,636

DATED : February 7, 1995

INVENTOR(S) : Susan D. Landry; F. Alexander Pettigrew

It is certified that error appears in the above-identified patent and that said Letters Patent is hereby corrected as shown below:

Column 6, Line 38, reads "... formulating HIPS ..." and should read -- ... formulated HIPS ... --.

Column 8, Line 8, reads "... claim 15 ..." and should read -- ... claim 16 ... --.

Signed and Sealed this

Twenty-third Day of May, 1995

Attest:

BRUCE LEHMAN

Attesting Officer

Commissioner of Patents and Trademarks